US012663353B2

(12) United States Patent (10) Patent No.: US 12,663,353 B2

Urban et al. (45) Date of Patent: Jun. 23, 2026

(54) SYSTEM FOR MEASURING CONTAMINATION OF AN AIR CONDITION

(71) Applicant: TUNAP GMBH & CO. KG, Wolfratshausen (DE)

(72) Inventors: Alfons Urban, Bad Heilbrunn (DE); Sabine Riha, Gmund am Tegernsee (DE)

(73) Assignee: TUNAP GMBH & CO. KG, Wolfratshausen (DE)

( * ) Notice: Subject to any disclaimer, the term of this patent is extended or adjusted under 35 U.S.C. 154(b) by 491 days.

(21) Appl. No.: 17/757,358

(22) PCT Filed: Oct. 22, 2020

(86) PCT No.: PCT/EP2020/079771

§ 371 (c)(1),
(2) Date: Jun. 14, 2022

(87) PCT Pub. No.: WO2021/121736

PCT Pub. Date: Jun. 24, 2021

(65) Prior Publication Data

US 2023/0033369 A1     Feb. 2, 2023

(30) Foreign Application Priority Data

Dec. 18, 2019    (EP) ..................................... 19217588

(51) Int. Cl.
*G01N 33/00*        (2006.01)
*B60H 1/00*        (2006.01)
(Continued)

(52) U.S. Cl.
CPC ......... *G01N 15/0656* (2013.01); *B60H 1/008* (2013.01); *B60H 3/0092* (2013.01); *G01N 27/125* (2013.01); *G01N 2015/0046* (2013.01)

(58) Field of Classification Search
CPC ..................... G01N 2015/0662; B60H 3/0092
See application file for complete search history.

(56) References Cited

U.S. PATENT DOCUMENTS 10,758,948 B1      9/2020  Harris
2002/0193064 A1*  12/2002  Michalakos ............. F24F 11/63
                                                    454/257
(Continued)

FOREIGN PATENT DOCUMENTS

CN        204 575 135 U      8/2015
CN        106 739 979 A      5/2017
(Continued)

OTHER PUBLICATIONS

Chinese Office action for Application No. 202080087954.4, dated Mar. 29, 2024, 11 pages.
(Continued)

*Primary Examiner* — John E Breene
*Assistant Examiner* — Alex T Devito
(74) *Attorney, Agent, or Firm* — Womble Bond Dickinson (US) LLP

(57) ABSTRACT

There is described a system for analyzing an air condition. The system comprises a detection unit configured for detecting of detection signals indicative of a bacteria-related contamination of an evaporator and/or an air filter of the air condition, an analyzing unit configured for analyzing of a level of contamination of the evaporator and/or the air filter based on the detection signals, and an output unit configured for outputting the analyzed level of contamination of the evaporator and/or the air filter to a user.

13 Claims, 3 Drawing Sheets

(51) Int. Cl.

| | | |
|---|---|---|
| *B60H 3/00* | (2006.01) | |
| *G01N 15/06* | (2006.01) | |
| *G01N 27/12* | (2006.01) | |
| *G01N 15/00* | (2006.01) | |

(56) References Cited

U.S. PATENT DOCUMENTS

| | | |
|---|---|---|
| 2005/0124286 A1 | 6/2005 | Goldsmith |
| 2012/0111190 A1 | 5/2012 | Dariavach et al. |
| 2016/0061747 A1 | 3/2016 | Lee et al. |
| 2016/0097311 A1 | 4/2016 | Coelho Ferreira |
| 2018/0236121 A1 | 8/2018 | Worrilow |
| 2020/0179857 A1 | 6/2020 | Delin |

FOREIGN PATENT DOCUMENTS

| | | | |
|---|---|---|---|
| CN | 206217577 U | | 6/2017 |
| CN | 207 407 489 U | | 5/2018 |
| DE | 199 57 364 B4 | | 9/2006 |
| DE | 10 2004 060 101 B4 | | 8/2007 |
| DE | 10 2006 033 528 B3 | | 10/2007 |
| DE | 10 210 003 966 B3 | | 5/2011 |
| DE | 10 2017 207 872 A1 | | 11/2018 |
| DE | 10 2011 076 513 B4 | | 5/2019 |
| EP | 1 602 924 A2 | | 12/2005 |
| ES | 2 093 550 A1 | | 12/1996 |
| JP | H02-068216 A | | 3/1990 |
| JP | 2000-179910 A | | 6/2000 |
| JP | 2001-171338 A | | 6/2001 |
| JP | 2002263449 | * | 9/2002 |
| JP | 2003130419 | * | 5/2003 |
| JP | 2004-301423 A | | 10/2004 |
| JP | 2005-180830 A | | 7/2005 |
| JP | 2012-21829 A | | 2/2012 |
| JP | 2017-137010 A | | 8/2017 |
| JP | 2018-004351 A | | 1/2018 |
| JP | 2019-66141 A | | 4/2019 |
| JP | 2019-517917 A | | 6/2019 |
| JP | 6587783 B1 | | 10/2019 |
| KR | 20020058108 A | | 7/2002 |
| KR | 10-2004-0016300 A | | 2/2004 |
| KR | 200400958 Y1 | | 11/2005 |
| KR | 10-2014-0068615 A | | 6/2014 |
| WO | WO 2014/084604 A1 | | 6/2014 |
| WO | 2018/206354 A1 | | 11/2018 |

OTHER PUBLICATIONS

International Search Report of PCT/EP2020/079771, Jan. 12, 2021, 6 pages.

Written Opinion of International Searching Authority of PCT/EP2020/079771, Jan. 12, 2021, 9 pages.

Extended European Search Report of EP 19217588.3, Jul. 1, 2020, 10 pages.

European Office action for Application No. 19217588.3, dated Mar. 9, 2023, 6 pages.

Japanese Office action for Application No. 2022-533654, dated Jan. 16, 2024, 8 pages.

Japanese Office action and Search Report for Application No. 2022-533654, dated Jul. 18, 2023, 24 pages.

* cited by examiner

SYSTEM FOR MEASURING CONTAMINATION OF AN AIR CONDITION

CROSS-REFERENCE TO RELATED APPLICATIONS

This application is a U.S. National Phase Patent Application of International Patent Application Number PCT/EP2020/079771, filed on Oct. 22, 2020, which claims priority to European Patent Application Number 19217588.3, filed on Dec. 18, 2019, the entire content of all of which is incorporated by reference herein.

TECHNICAL FIELD

Embodiments of the present invention relate to a system and a method for analyzing an air condition, in particular in a vehicle, and the use in an air condition.

TECHNOLOGICAL BACKGROUND

In an air condition compressed cooling fluid, such as R134a or R1234yf, evaporate from liquid to gas within the system while absorbing heat from the enclosed cooled area, such as an interior of the vehicle, such as a car. The evaporator of an air condition is subjected to an airflow which flows from the ambient environment into the interior of the cooled area. When passing the evaporator, the airflow cools down, wherein a condensate is generated at the outer surface of the evaporator. The condensate and hence the high moisture of the evaporator can cause a growth of bacteria and funguses.

The bacteria and funguses affect the interior of the cooling area and can cause bad smells in the interior of the cooling area. Furthermore, the air quality in interior of the cooling area, such as the interior of the car, influences the mental concentration and judgment, reaction time and fitness of the vehicle driver.

Hence, air conditions and in particular the evaporator of air conditions, in particular in the vehicle, have to be cleaned in order to reduce the bad smells and to increase the air quality. In most cases, the air condition, in particular of the car, can be cleaned during maintenance work of the car in a garage. It is known to measure the contamination of an evaporator by analyzing the condensate of the air condition. In particular, the concentration of bacteria and funguses may be measured. This may need one hour up to 3 days, based on the used test equipment. Furthermore, it is difficult to get the condensate without any influence from outside and it is necessary to partially disassemble the air condition to get the condensate. Furthermore, gas sensors are known which measure the concentration of volatile organic compounds (VOCs) in the air.

SUMMARY

There may be a need to provide a system for analyzing the contamination of an air condition in particular before bad smells in cooled air of the air condition occurs.

This object is solved by a system for analyzing an air condition, a use of the respective system and a method for analyzing an air condition according to the independent claims.

According to first aspect of the present invention a system for analyzing an air condition is presented. The system comprises a detection unit configured for detecting of detection signals indicative of a (e.g. bacteria-related) contamination with a contaminant of an evaporator and/or the air filter of the air condition, an analyzing unit configured for analyzing of a level of the contamination of the evaporator based on the detection signals, and an output unit configured for outputting the analyzed level of contamination with a contaminant of the evaporator and/or the air filter to a user.

According to a further aspect, a use of the above-described system is presented for detecting, analyzing, and outputting a level of contamination with a contaminant of an evaporator and/or the air filter of an air condition, in particular an air condition of a vehicle.

According to further exemplary embodiment, a method of analyzing an air condition is provided. According to the method, detecting of detection signals indicative of a (e.g. bacteria-related) contamination with a contaminant of an evaporator and/or the air filter of the air condition, analyzing of a level of the contamination with the contaminant of the evaporator and/or the air filter based on the detection signals, and outputting the analyzed level of contamination with the contaminant of the evaporator and/or the air filter to a user, are conducted.

The air condition comprises amongst others the evaporator to evaporate a cooling fluid from liquid to gas within the air condition system while absorbing heat from the enclosed cooled area. Ambient air is blown against the evaporator to absorb the heat from the ambient air. The cooled ambient air is then blown to an interior of the cooled area, such as an interior of a room or a vehicle, such as a car. When passing the evaporator, the ambient air cools down, wherein a condensate is generated at the outer surface of the evaporator. The condensate and hence the high moisture of the evaporator may cause a growth of the contaminant, e.g. bacteria and funguses.

Furthermore, an air condition system may comprise an air filter, which may be a cabin air filter, in particular of a vehicle. The air filter filters particles, such as pollens or other dust particles, out of the ambient air which is blown after the air filter further through the air condition and further in the cabin of a vehicle. Due to moisture and contamination of the air filter, a growth of the contaminant, e.g. bacteria and funguses, may occur.

Specifically, the above-described system may be part of the air condition, partially integrated in the air condition or may be an external system which can be removably coupled to the air condition to be tested. Accordingly, the respective system may be portable and coupleable to different air conditions. Furthermore, some units of the system or all units of the system may be installed in an air condition. For example, the detection unit may be an external part and may be detachably attached to the air condition system, in particular to an exhaust tube of the air condition, wherein the analyzing unit or the decontamination unit (described below) may be integrated in the air condition system.

In common air condition systems, beside the ambient air, also a high amount of cabin air is sucked into the air condition and is temperature treated (heated or cooled) therein, because it is more energy efficient to e.g. cool only a part of the ambient air and to mix additionally the ambient air with the cabin air. Hence, because also cabin air is blown against the evaporator and the air filter, also contaminants generated within the cabin may be detected by the detection device.

The contaminant may be a bacteria related contaminant or contamination. Furthermore, the contaminant may be an odor-former such as carbon acids, esters, keto acids, organic amines, ammonia, thiols, originated from humans, animals, or food. Carbonic acid may also be an effluvium or vapor of plastic material. In other words, the contaminant may be indicative of carbonic acid which is an effluvium or vapor of plastic material. For example, components, such as lining or covering parts, in a cabin of a vehicle are made of plastic material which vapors an effluvium or vapor of carbonic acids. Carbonic acids are a contaminant to be measured because bad smells may be caused.

The detection unit is configured for detecting of detection signals indicative of the contaminant, e.g. a bacteria-related contamination or carbon acid contamination of the evaporator and/or the air filter. Specifically, the detection unit detects the quality of exhaust air of the air condition and the quantity of chemical substances indicative of the level (concentration) of the contaminant, e.g. the bacteria-related contamination and/or the concentration of carbonic acid. For example, the detection unit detects respective physical and/or chemical parameters and convert the measured values of the parameters in detection signals. The physical and/or chemical parameters are indicative of the level of the contaminant of the evaporator and/or the air filter.

Furthermore, the detection unit may detect specific operating conditions of the air condition, such as operating time, temperature of injected ambient air, cooling rate of ambient air and/or humidity of ambient air. Based on the detected operating conditions, the analyzing unit may conduct a comparison with the detected operating conditions and predefined operating data stored e.g. in a database, in order to determine the level of the contaminant, e.g. of the bacteria-related contamination, of the evaporator. For example, based on measuring the operating time and cooling rate of ambient air, the level of bacteria related contamination may be estimated.

The analyzing unit is coupled to the detection unit for receiving the detection signals and analyzes the level of the contaminant, of the evaporator and/or the air filter based on the detection signals. The analyzing unit comprises for example a CPU and a memory for storing respective data, for example. The analyzing unit may be coupled to the detection unit wire bond or wireless.

The output unit outputs the analyzed level of contaminant of the evaporator and/or the air filter to a user. The output unit may be configured for generating acoustic or visual signals to output the respective analyzed level to the user. For example, the output unit comprises a loudspeaker and/or a visual screen in order to generate respective signals.

The respective units of the system may be connected to an energy source, such as the energy source of the air condition. Furthermore, the respective units of the system may comprise a battery, in particular a rechargeable battery.

According to embodiments of the present invention, a system for analyzing the contamination of an evaporator and/or an air filter of an air condition, such that contamination of air to be cooled can be reduced. Using the system according to embodiments of the present invention allows to clean and decontaminate the air condition and in particular the evaporator or air filter before the contamination of air, respectively, exceeds predefined threshold values. Furthermore, the service intervals for maintaining the air condition can be made flexible, because the consideration of the current and real contamination (e.g. by bacteria or carbon acids) by which a necessary air condition service and to contamination is necessary. In conventional approaches, the conditions have to be maintained in a flexible and static service intervals. Accordingly, air conditions are maintained and decontaminated, although the level of contamination may be still low and does not exceed the predefined threshold values. By embodiments of the present invention, an indication of maintaining the air condition can be taken from the output unit, if the analyzing unit analyzes a level of contamination which exceeds the respective predefined threshold values. Hence, unnecessary costs for maintaining of the condition can be avoided.

According to further exemplary embodiment, the analyzing unit is configured to generate a decontamination signal if the analyzed level of the contaminant, e.g. the bacteria-related contamination, exceeds a predetermined level (i.e. a predefined threshold value) of the contaminant. The output unit is in particular configured for outputting the decontamination signal. For example, the predefined threshold value of the bacteria related contamination describes a respective level of contaminant, e.g. a bacteria related contamination or carbonic acid contamination, where no bad smells and no negative influence of the area to be cooled may be caused. The analyzing unit is configured to compare the measured level of bacteria related contamination from the detection signals with a predefined level of contaminant, e.g. a bacteria related contamination, which is indicative of a requirement to decontaminate the air condition in order to lower the level of contaminant, e.g. bacteria related contamination in particular of the evaporator. The output unit is configured to output the decontamination signal. The output of the output unit may be an acoustic signal or may be a graphical symbol which illustrates the need to maintain the air condition.

According to further exemplary embodiment, the system comprises a decontamination unit, wherein the decontamination unit is coupleable to the evaporator for decontaminating the evaporator and/or the air filter based on the decontamination signal. For example, alternatively or in addition to visualize the need for decontaminating the air condition, an active component, such as the decontamination unit, may be provided to conduct a contamination procedure in order to lower the level of contaminant of the evaporator and/or the air filter. For example, the analyzing unit may be coupled to the decontamination unit for transmitting the decontamination signal to the decontamination unit. Upon receiving the decontamination signal, respective decontaminating tasks may be started by the decontamination unit. The decontamination unit may decontaminate the evaporator and/or the air filter by injecting a chemical decontaminating fluid to the evaporator. Furthermore, the decontamination unit may heat the evaporator and/or the air filter until the respective bacteria and funguses are eliminated or the carbonic acids are neutralized. Furthermore, the decontamination unit may comprise an Ultraviolet light source (UV source) for eliminating bacteria and funguses. Hence, it is not necessary to maintain the air condition in a garage.

For example, according to an exemplary embodiment of the invention, the decontamination unit comprises a chemical exhaust nozzle for ejecting chemical decontamination fluid to the evaporator and/or the air filter. For example, the decontamination fluid may comprise a fungicide, an antibacterial fluid, comprising for example compounds of chlorine, ozone or alcohols or a catalyst agent which reacts with the contaminant, e.g. the carbonic acid.

According to further exemplary embodiment, the decontamination unit comprises a heating element coupleable to the evaporator and/or the air filter for heating up the evaporator and/or the air filter in order to reduce contamination. The heating element may be a resistance heater which is adapted for heating up the evaporator up to 70° C., in particular more than 90° C. or more than 100° C.

According to further exemplary embodiment, the detection unit is coupleable to an exhaust air channel of the air condition for measuring the contamination. For example, the detection unit comprises the sensor element which extends into the air channel. The detection unit may comprise fixing means for detachably fixing the detection unit to the exhaust air channel. For example, the fixing means comprise hook elements which can be hooked into a ventilation grid of the exhaust air channel. Furthermore, for example, the fixing means may comprise clamping elements which clamps the detection unit inside the exhaust air channel. For example, the clamping means may be elastically deformable spreading elements.

According to further exemplary embodiment, the detection unit comprises a contamination sensor for measuring a concentration of volatile organic compounds, in the exhausted air of the air condition, wherein the concentration of volatile organic compounds, in particular the contaminant such as isopropanol and/or carbonic acids, is indicative of the level of the contaminant, such as bacteria-related contamination and contamination with carbonic acids of the evaporator and/or the air filter. Specifically, it has found out, that the concentration of volatile organic compounds (VOCs), such as alcohols, e.g. isopropanol, is indicative for the level of bacteria related contamination, because bacteria and funguses generate small amounts of the respective chemicals. Furthermore, the odor formers, such as carbon acids which are also volatile organic compounds can be generated by plastic parts for example in a cabin of a vehicle.

The contamination sensor may comprise a plurality, e.g. three, different sensitive layers (e.g. MOX layers), one for reducible, one for easily oxidizable and one for heavily oxidizable gases. The respective gas components influence the resistance of the layers. Hence, based on the change of the resistance in each of the sensitive layers, an exact result about the concentration of the volatile organic compounds and hence the contaminant can be achieved. Specifically, the contamination sensor is configured for measuring volatile organic compounds which can react with oxygen, i.e. VOCs which may be oxidized or deoxidized.

According to further exemplary embodiment, the contamination sensor is configured for measuring a concentration of volatile organic compounds of at least 8 ppb (parts per billion), in particular at least 6 ppb, in the exhausted air. Hence, small amounts of respective volatile organic compounds can be measured so that an exact prediction of the level of contamination of bacteria related substances is possible.

According to further exemplary embodiment, the detection unit comprises an air flow sensor for detecting a flow of exhaust air of the air condition. Hence, by providing the airflow sensor, it is possible to measure the operation of the air condition. For example, if an airflow in the exhaust air duct is measured, a detection of the contaminant of the evaporator and/or the air filter may be started. Hence, a self-acting and automatic operation of the inventive system to be provided without the need of providing manual initialization of the detection procedure.

Furthermore, the detection unit may comprise a temperature sensor and/or a humidity sensor for measuring the temperature and humidity of the exhausted air over time. Hence, an operation over time of the air condition can be measured which may also be indicative of the growth of bacteria and funguses at the evaporator and or the air filter. Furthermore, an operation over time of the air condition can be measured which may also be indicative of the evaporation of carbonic acids out of the plastic parts within the cabin.

According to further exemplary embodiment, the detection unit, the analyzing unit, the output unit and/or the decontamination unit are coupled wire connected or wireless connected for transmitting data. For example, the respective units may comprise standardized and/or detachable cable connection, such as USB (Universal serial bus) connections. Furthermore, all or some of the units may be connected for transmitting data via wireless standards, such as Bluetooth, WLAN, Wi-Fi or NFC (near field communication) connections.

According to further exemplary embodiment, the output unit is a handheld device, in particular a smartphone or a tablet computer. Hence, the analyzing unit, the detection unit and/or the decontamination unit may comprise a unique or respective separate housings which are coupleable to the air condition, whereas the user of the system may be connected wire bond or wireless to the analyzing unit, the detection unit and/or the decontamination unit with his smart phone or tablet computer, for example.

According to further exemplary embodiment, the air condition is an air condition of a vehicle, in particular a car, wherein the analyzing unit is a control unit of the vehicle. In other words, the analyzing unit and also optionally the detection unit, the decontamination unit and/or the output unit may be integrated in the air condition or the vehicle, respectively. The analyzing unit may be part of the control unit of the vehicle. Furthermore, the output unit may be a respective screen of the cockpit of the vehicle.

Furthermore, according to an aspect of the method, a decontamination signal is generated if the analyzed level of the contaminant exceeds a predetermined level of the bacteria-related contamination. Next, the evaporator and/or an air filter is decontaminated based on the decontamination signal. In particular, after the decontaminating, the level of contaminant is analyzed if the analyzed level of has fallen below a predetermined level of contamination. Hence, the result of the decontamination of the evaporator and/or an air filter can be verified. If the determination is insufficient, a further step of the decontaminating the evaporator and/or an air filter may be started until the desired level of contamination is achieved.

It has to be noted that embodiments of the invention have been described with reference to different subject matters. In particular, some embodiments have been described with reference to apparatus type claims whereas other embodiments have been described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this application.

BRIEF DESCRIPTION OF THE DRAWINGS

The aspects defined above, and further aspects of the present invention are apparent from the examples of embodiment to be described hereinafter and are explained with reference to the examples of embodiment. Embodiments of the invention will be described in more detail hereinafter with reference to examples of embodiment but to which the invention is not limited.

DETAILED DESCRIPTION OF EXEMPLARY EMBODIMENTS

Figure 1:
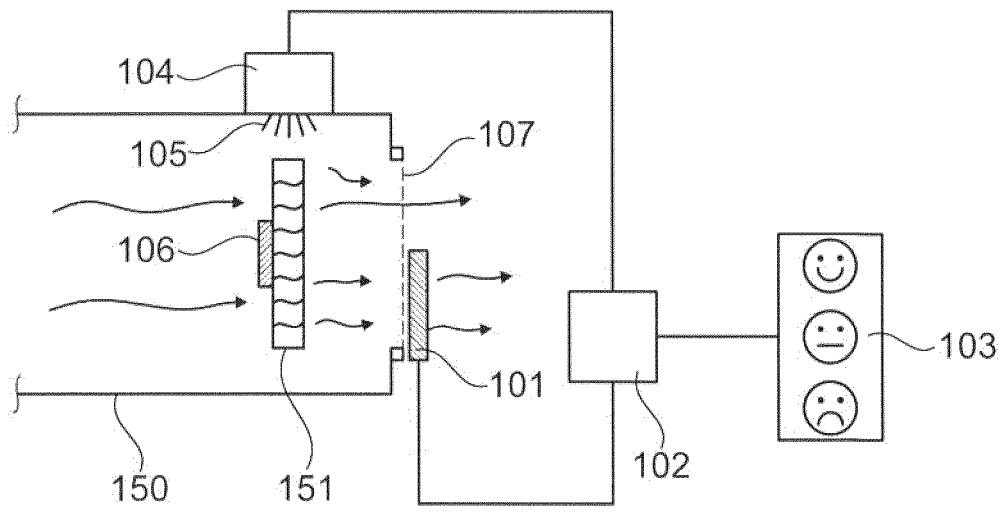
FIG. 1 shows a schematic view of a system for analyzing an air condition according to an exemplary embodiment of the present invention.

The illustrations in the drawings are schematic. It is noted that in different figures similar or identical elements are provided with the same reference signs.

FIG. 1 shows a schematic view of a system for analyzing and air condition 150 according to an exemplary embodiment of the present invention. The system comprises a detection unit 101 configured for detecting of detection signals indicative of a bacteria-related contamination or a carbonic acid contamination of an evaporator 151 and/or an air filter of the air condition 150, an analyzing unit 102 configured for analyzing of a level of the contamination of the evaporator 151 with a contaminant based on the detection signals, and an output unit 103 configured for outputting the analyzed level of contamination of the evaporator 151 and/or of carbonic acids t to a user.

The air condition 150 comprises amongst others the evaporator 151 to evaporate a cooling fluid from liquid to gas within the air condition system while absorbing heat from the enclosed cooled area. Ambient air is blown against the evaporator 151 to absorb the heat from the ambient air. The cooled ambient air is then blown to an interior of the cooled area, such as an interior of the room or a vehicle, such as a car. When passing the evaporator 151, the ambient air cools down, wherein a condensate is generated at the outer surface of the evaporator 151. The condensate and hence the high moisture of the evaporator 151 may cause a growth of bacteria and funguses.

Furthermore, the air condition 150 may comprise the air filter, which may be a cabin air filter, in particular of a vehicle. The air filter filters particles, such as pollens or other dust particles, out of the ambient air which is blown after the air filter further through the air condition 150 and further in the cabin of the vehicle.

The detection unit 101 is configured for detecting of detection signals indicative of the contaminant of the evaporator 151 or the air filter. Specifically, the detection unit 151 detects the quality of exhaust air of the air condition. For example, the detection 151 unit detects respective physical parameters and convert the measured values of the parameters in detection signals. The physical parameters are indicative of the bacteria-related contamination of the evaporator 151 and/or the air filter. The detection unit 151 comprises a contamination sensor for measuring a concentration of volatile organic compounds in the exhausted air of the air condition 150, wherein the concentration of volatile organic compounds, in particular isopropanol and/or carbonic adds, is indicative of the level of the bacteria-related contamination of the evaporator 151. Specifically, it has found out, that the concentration of volatile organic compounds, and specifically isopropanol and/or carbonic adds, is indicative for the level of bacteria related contamination, because bacteria and funguses generate small amounts of the respective chemicals.

Furthermore, detection unit 101 may comprise an air flow sensor for detecting a flow of exhaust air of the air condition. Hence, by providing the airflow sensor, it is possible to measure the operation of the air condition 150. The detection unit 101 may also comprise a temperature sensor and/or a humidity sensor for measuring the temperature and humidity of the exhausted air over time. Hence, an operation over time of the air condition 150 can be measured which may also be indicative of the growth of bacteria and funguses at the evaporator 151. Furthermore, the contaminant may be or indicative of carbonic acid which is an effluvium or vapor of plastic material. Furthermore, the detection unit 101 may detect specific operating conditions of the air condition, such as operating time, temperature of injected ambient air, cooling rate of ambient air and/or humidity of ambient air. Based on the detected operating conditions, the analyzing unit 102 may conduct a comparison with the detected operating conditions and predefined operating data stored e.g. in a database, in order to determine the level of bacteria-related contamination or vapor of plastic material of the evaporator and/or air filter. For example, based on measure the operating time and cooling rate of ambient air, the level of bacteria related contamination or the amount of vaporized carbonic acids out of plastic material may be estimated.

The detection unit 101, the analyzing unit 102 and/or the output unit 103 are coupled wire connected for transmitting data.

The analyzing unit 102 is coupled to the detection unit 101 for receiving the detection signals and analyzes the level of contaminant on the evaporator 151 and/or the air filter based on the detection signals. The analyzing unit 102 comprises for example a CPU and a memory for storing respective data, for example. The analyzing unit 102 is coupled in the exemplary embodiment of FIG. 1 to the detection unit 101 wire bond.

The analyzing unit 102 is configured to generate a decontamination signal if the analyzed level of the contaminant, e.g. indicative of the bacteria-related contamination and or concentration of carbonic acid exceeds a predetermined level (i.e. a predefined threshold value). The output unit 103 is configured for outputting the decontamination signal. For example, the predefined threshold value of the bacteria related contamination or carbonic acid describes a bacteria related and/or carbonic acid contamination, where no bad smells no negative influence of the area to be cooled are caused. The analyzing unit 102 is configured to compare the measured level of contamination from the detection signals with a predefined level of bacteria related contamination which is indicative of a requirement to decontaminate the air condition 150 in order to lower the level of contamination in particular of the evaporator 151.

The output unit 103 outputs the analyzed level of contamination of the evaporator 151 and/or the air filter to a user. The output unit 103 may be configured for generating acoustic or visual signals to output the respective analyzed level to the user. As shown in FIG. 1, the output unit may illustrate symbols indicative of a low contamination, a medium contamination, and a high contamination.

The system comprises a decontamination unit 104, wherein the decontamination unit is coupleable to the evaporator 151 for decontaminating the evaporator 151 based on the decontamination signal. For example, in addition to visualize the need for decontaminating the air condition, and active component, such as the decontamination unit 104, is provided to conduct a contamination procedure in order to lower the level of contamination of the evaporator 151. The analyzing unit 102 is coupled to the decontamination unit 104 for transmitting the decontamination signal to the decontamination unit 104. Upon receiving the decontamination signal, respective decontaminating tasks may be started by the decontamination unit 104. The decontamination unit 104 may decontaminate the evaporator 151 and/or the air filter by injecting a chemical decontaminating fluid to the evaporator 151. Furthermore, the decontamination unit 104 may heat the evaporator 151 until the respective bacteria and funguses are eliminated and/or the level of carbonic acids is reduced. The decontamination unit 104 comprises a chemical exhaust nozzle 105 for ejecting chemical decontamination fluid to the evaporator 151 and/or the air filter.

The detection unit 101 is coupled to an exhaust air channel 107 of the air condition 150 for measuring the contamination. For example, the detection unit 101 comprise the sensor layers along which air from the air channel 107 flows along. The detection unit 101 comprises fixing means for detachably fixing the detection unit 101 to the exhaust air channel 107. For example, the fixing means comprise hook elements which can be hooked into a ventilation grid of the exhaust air channel 107. The analyzing unit 102 and the output unit 103 are functionally coupled to the detection unit 101 for transmitting respective signals.

Furthermore, during operation of the system, a decontamination signal is generated if the analyzed level of the bacteria-related contamination exceeds a predetermined level of the contaminant. Next, the evaporator 151 and/or the air filter is decontaminated based on the decontamination signal. In particular, after the decontaminating, the level of contaminant is analyzed if the analyzed level of the contaminant falls below a predetermined level of the contaminant. Hence, the result of the decontamination of the evaporator 151 and/or air filter can be verified. If the determination is insufficient, a further step of the decontaminating the evaporator 151 and/or air filter may be started until the desired level of bacteria-related contamination is achieved.

Figure 2:
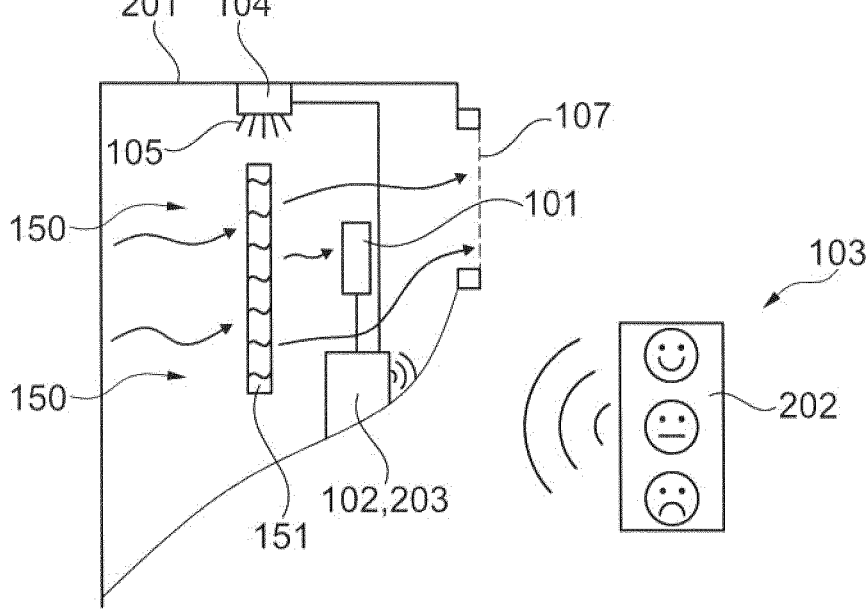
FIG. 2 shows a schematic view of the system for analyzing an air condition of a vehicle according to an exemplary embodiment of the present invention.

FIG. 2 shows a schematic view of the system for analyzing and air condition of a vehicle according to an exemplary embodiment of the present invention. The shown exemplary embodiment, an air condition 150 and in particular the evaporator 151 and/or the air filter is integrated in a center console 201 of a vehicle, in particular a car.

Ambient air is blown against the evaporator 151 to absorb the heat from the ambient air. The cooled ambient air is then blown to an interior of the cooled area, such as an interior of the car. When passing the evaporator 151, the ambient air cools down, wherein a condensate is generated at the outer surface of the evaporator 151. The condensate and hence the high moisture of the evaporator 151 may cause a growth of bacteria and funguses.

The detection unit 101, the analyzing unit 102 and the decontamination unit 104 are integrated in the center console 201 of the car. Specifically, the detection unit 101 is functionally coupled and arranged within and exhaust air channel 107 which is formed inside the center console 201. The system shown in FIG. 2 may comprise the same functional units as shown in the embodiment in FIG. 1.

For example, the analyzing unit 102 is integrated or formed by the control unit 203 of the car. For example, control unit 203 controls also the operation of the air condition and hence the temperature of the cooled area inside the car. Hence the functional interaction between the air condition 150 and the system according to embodiments of the present invention is given and combined with in a unique control unit 203.

The analyzing unit 102 may generate a decontamination signal if the analyzed level of the contamination exceeds a predetermined level (i.e. a predefined threshold value) of the contamination. The decontamination unit 104 is coupleable to the evaporator 151 for decontaminating the evaporator 151 based on the decontamination signal. Upon receiving the decontamination signal, respective decontaminating tasks may be started by the decontamination unit 104. The decontamination unit 104 may decontaminate the evaporator 151 and/or air filter by injecting a chemical decontaminating fluid to the evaporator 151 and/or air filter. Furthermore, the decontamination unit 104 may heat the evaporator until the respective bacteria and funguses are eliminated and/or the concentration of carbonic acids are reduced. The decontamination unit 104 comprises a chemical exhaust nozzle 105 for ejecting chemical decontamination fluid to the evaporator 151.

For example, the analyzing unit 102, the detection unit 101 and the decontaminating unit 104 are coupled in the shown example wire bond. The analyzing unit 102 and the output unit 103 may be coupled wireless, for example via Bluetooth or NFC, in order to transmit data between the 2 units 102, 103. For example, the control unit 102 may transmit the decontamination signal to the output unit 103. Based on the decontamination signal, respective symbols indicative of the level of bacteria-related contamination of the evaporator 151 are shown in the display of the output unit 103. On the other side, automatically based on the received detection signal or mineral upon a control input of the user, the output unit 103 may transfer a control signal to the analyzing unit 102 in order to start a decontamination cycle of the decontamination unit 104.

The output unit 103 may be a display of the center console 201 of the car. Alternatively, the output unit 103 may be a handheld 202, such as a cell phone or a tablet computer.

The respective units 101, 102, 103, 104 of the system may be connected to an energy source, such as the energy source of the air condition 150 and of the vehicle, respectively.

Figure 3:
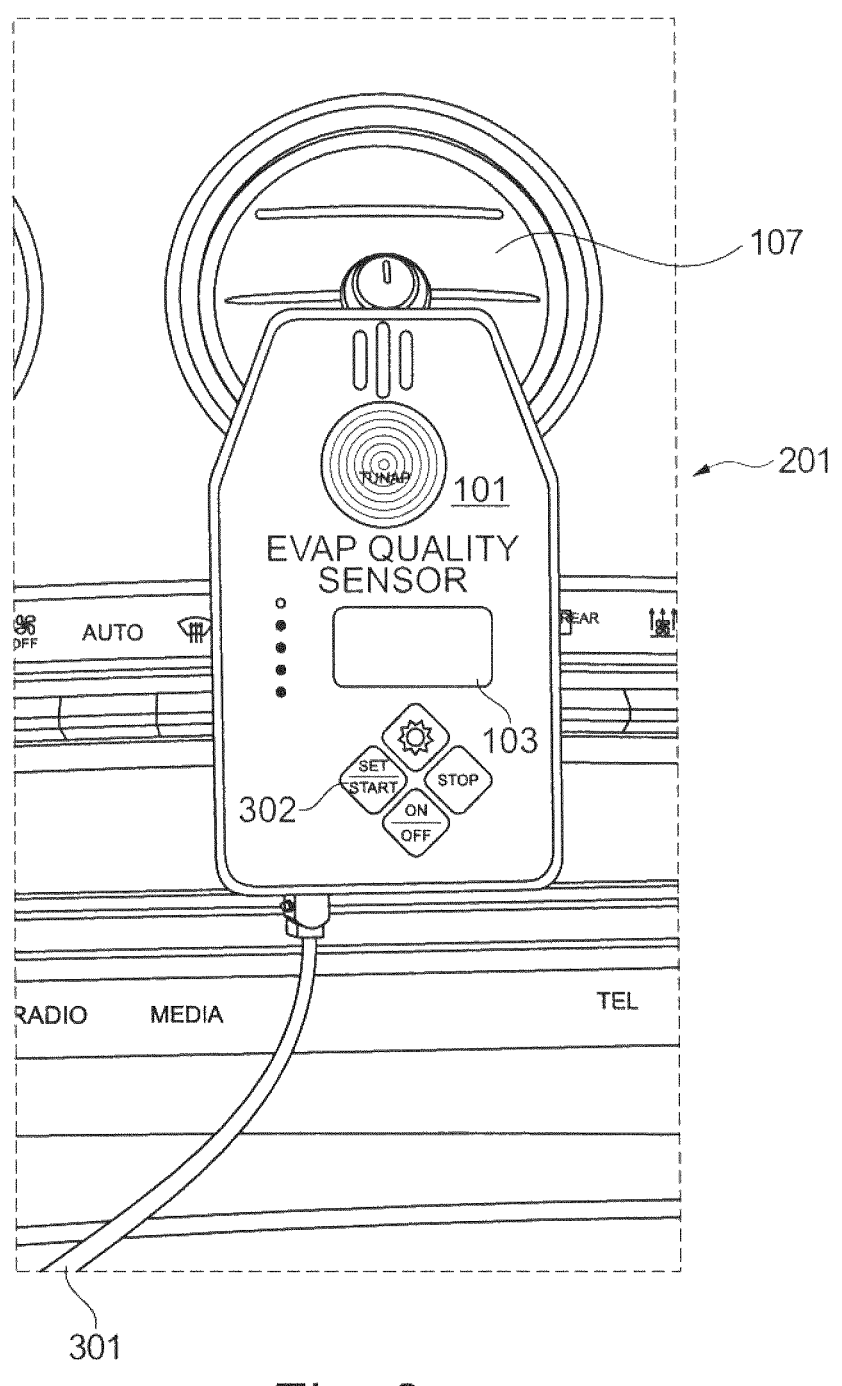
FIG. 3 shows a schematic view of a detection unit mounted to a center console of a vehicle according to an exemplary embodiment of the present invention.

FIG. 3 shows a schematic view of a detection unit 101 mounted to a center console 201 of a vehicle according to an exemplary embodiment of the present invention. The detection unit 101 may be a handheld and clipped or hooked to an exhaust grid (air vent) of an exhaust air channel 107 formed within the center console 201. From the detection unit 101, sensor layers are accessible by the exhausted air. Hence, along the sensor layers air from the air channel 107 flows along. A plurality, e.g. three, different sensitive layers (e.g. MOX layers), one for reducible, one for easily oxidizable and one for heavily oxidizable gases may be provided. The respective gas components influence the resistance of the layers. Hence, based on the change of the resistance in each of the sensitive layers, an exact result about the concentration of the volatile organic compounds and hence the contaminant can be achieved Furthermore, in the detection unit 101, the output unit 103 may be integrated. For example, the output unit 103 comprises a display showing the level of contamination of the evaporator 151 and/or the air filter of the air condition 150.

The detection unit 101 may be coupled to an external analyzing unit 102 via a USB cable 301. Additionally, the USB cable 3 and 1 may be used for operating and/or charging the detection unit 101.

Additionally, the detection unit 101 may comprise control buttons 302 for amending the display most of the output unit 103. For example, also be analyzing unit 102 may be integrated in the detection unit 101. Accordingly, by the shown control buttons 302, a control of the decontamination unit 104 may be given. For example, a decontamination cycle may be started by pushing the respective control buttons 302.

Figure 4:
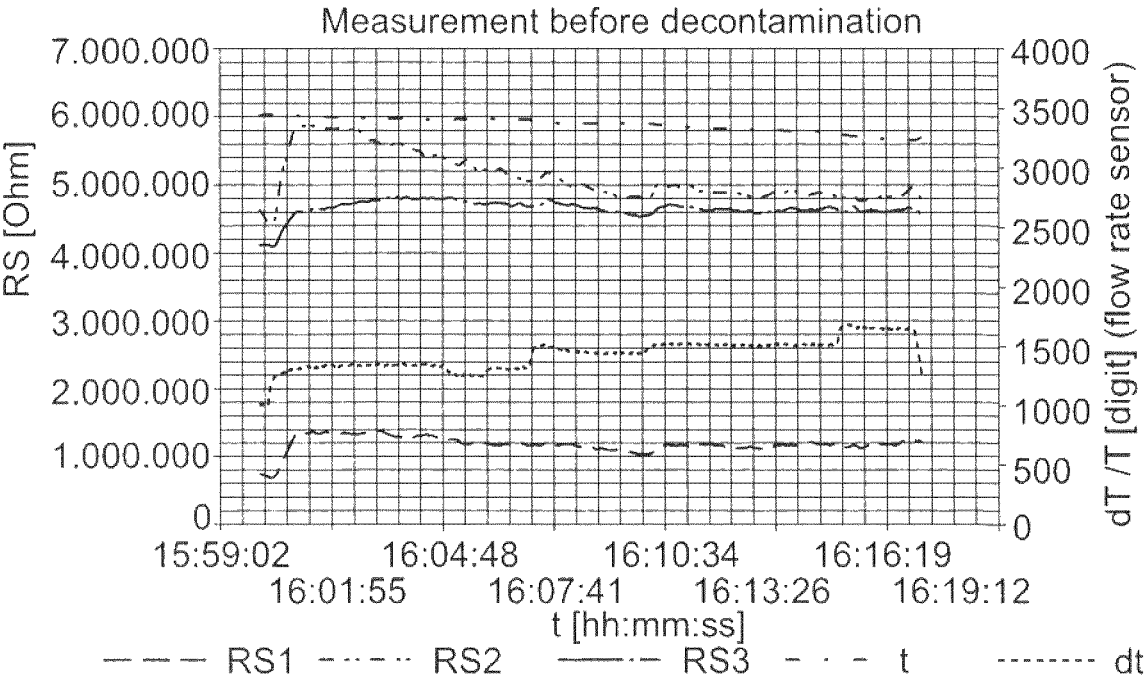
FIG. 4 shows a diagram of sensor measurement results before a decontamination step according to an exemplary embodiment of the present invention.

FIG. 4 shows a diagram of sensor measurement results before a decontamination step according to an exemplary embodiment of the present invention. The sender of the detection unit 101 comprises sensor layers which are accessible by the exhausted air of the air conditioning 150. Along sensor layers air from the air channel 107 flows. The sender comprises a plurality, e.g. three, different sensitive layers (e.g. MOX layers), one for reducible, one for easily oxidizable and one for heavily oxidizable gases may be provided. The respective gas components influence the resistance of the layers. Hence, based on the change of the resistance in each of the sensitive layers, an exact result about the concentration of the volatile organic compounds (VOC) and hence the contaminant can be achieved.

In FIG. 4, contaminated exhaust air of the air conditioning 150 of an uncleaned air condition 150 is illustrated. For example, the air filter as well as the evaporator 151 are contaminated. Hence, in the diagram the respective resistances of the three sensitive layers RS1, RS2, RS3 are shown. As can be taken from the diagram, the ohmic resistance of the three sensitive layers RS1, RS2, RS3 is between 1.000.000 and 5.800.000 Ohm. The temperature t and the flow velocity dt is kept constant.

Figure 5:
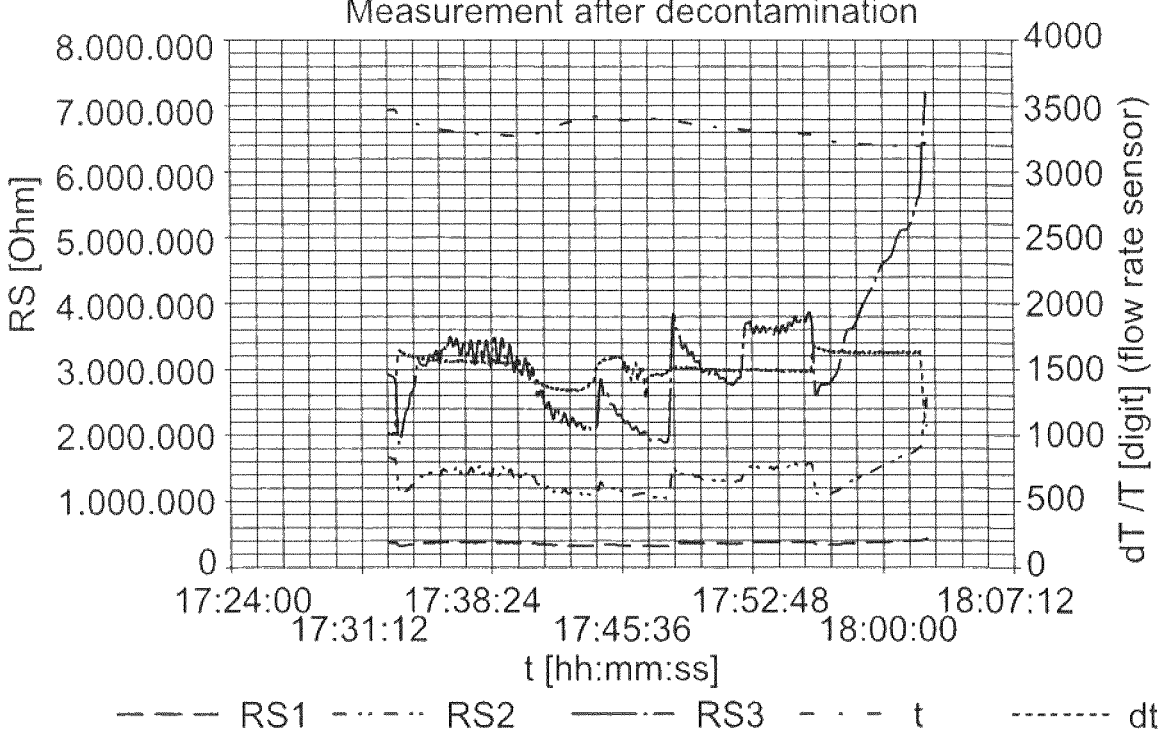
FIG. 5 shows a diagram of sensor measurement results before a decontamination step according to an exemplary embodiment of the present invention.

FIG. 5 shows a diagram of sensor measurement results before a decontamination step according to an exemplary embodiment of the present invention.

In FIG. 5, contaminated exhaust air of the air condition 150 of a decontaminated air condition 150 is illustrated. For example, the air filter comprising a filter element and the holding is decontaminated by exchanging the filter element and cleaning the filter housing. The evaporator 151 may be cleaned by a chemical agent. As can be taken from the diagram, the ohmic resistance of the three sensitive layers RS1, RS2, RS3 is dramatically reduced between 40.000 and 380.000 Ohm. The temperature t and the flow velocity dt is kept constant.

Hence, the reduced ohmic resistance is indicative for a reduction of the contaminant, e.g. indicative of bacteria-related contamination and/or a contamination with carbonic acids.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 101 detection unit
102 analyzing unit
103 output unit
104 decontamination unit
105 chemical exhaust nozzle
106 heating element
107 exhaust air channel
150 air condition
151 evaporator
201 Center console
202 handheld
203 control unit
301 USB Cable
302 control button

The invention claimed is:

1. A system for analyzing an air conditioner, the system comprising:
 a detection unit configured for detecting of detection signals indicative of a bacteria-related contamination with a contaminant of an evaporator and/or the air filter of the air conditioner,
 wherein the detection unit comprises a contamination sensor for measuring a concentration of volatile organic compounds in the exhausted air of the air conditioner,
 wherein the concentration of volatile organic compounds is indicative of the level of the bacteria-related contaminant,
 wherein the detection unit is further configured to detect operating conditions of the air conditioner,
 an analyzing unit configured for analyzing of a level of bacteria-related contamination of the evaporator and/or an air filter based on the detection signals, and by conducting a comparison with the detected operating conditions and predefined operating data of the air conditioner; and
 an output unit configured for outputting the analyzed level of bacteria-related contamination with the contaminant of the evaporator and/or the air filter to a user.

2. The system according to claim 1,
 wherein the analyzing unit is configured to generate a decontamination signal if the analyzed level of the contaminant exceeds a predetermined level of the contaminant,
 wherein the output unit is configured for outputting the decontamination signal.

3. The system according to claim 2, further comprising a decontamination unit,
 wherein the decontamination unit is coupleable to the evaporator for decontaminating the evaporator and/or the air filter based on the decontamination signal.

4. The system according to claim 3,
 wherein the decontamination unit comprises a chemical exhaust nozzle for ejecting chemical decontamination fluid to the evaporator and/or the air filter.

5. The system according to claim 3,
 wherein the decontamination unit comprises a heating element coupleable to the evaporator and/or the air filter for heating up the evaporator and/or the air filter in order to reduce the level of contaminant.

6. The system according to claim 1,
 wherein the detection unit is coupleable to an exhaust air channel of the conditioner for measuring the level of contaminant.

7. The system according to claim 1,
 wherein the contamination sensor is configured for measuring a concentration of volatile organic compounds of at least 8 ppb in the exhausted air.

8. The system according to claim 1,
 wherein the detection unit comprises an air flow sensor for detecting a flow of exhaust air of the air conditioner.

9. The system according to claim 1,
 wherein the detection unit, the analyzing unit and/or the output unit are coupled wire connected or wireless connected for transmitting data.

10. The system according to claim 1,
 wherein the output unit is a handheld device.

11. The system according to claim 1,
 wherein the air conditioner is an air conditioner of a vehicle,

wherein the analyzing unit is a control unit of the vehicle.

12. A method of analyzing an air condition of the system for analyzing an air conditioner of claim 1, the method comprising:

detecting of detection signals indicative of a contamination with a contaminant of an evaporator and/or an air filter of the air conditioner, analyzing of a level of the contamination with the contaminant of the evaporator and/or the air filter based on the detection signals, and outputting the analyzed level of contamination with the contaminant of the evaporator and/or the air filter to a user.

13. The method according to claim 12, generating a decontamination signal if the analyzed level of the contaminant exceeds a predetermined level of the contamination, decontaminating the evaporator and/or the air filter based on the decontamination signal, analyzing the level of contamination with the contaminant after decontaminating the evaporator and/or the air filter if the analyzed level of the contamination with the contaminant falls below a predetermined level of the contamination with the contaminant.

\* \* \* \* \*